United States Patent
Lee et al.

(10) Patent No.: US 9,977,943 B2
(45) Date of Patent: May 22, 2018

(54) BIOLOGICAL INFORMATION RECOGNITION APPARATUS AND SCANNING METHOD OF THE BIOLOGICAL INFORMATION RECOGNITION APPARATUS

(71) Applicant: BEFS CO., LTD., Seoul (KR)

(72) Inventors: Seungjin Lee, Yongin (KR); Changhyeok Bang, Seoul (KR)

(73) Assignee: BEFS CO., LTD, Seoul (KR)

( * ) Notice: Subject to any disclaimer, the term of this patent is extended or adjusted under 35 U.S.C. 154(b) by 0 days. days.

(21) Appl. No.: 15/168,063

(22) Filed: May 29, 2016

(65) Prior Publication Data
US 2017/0344778 A1 Nov. 30, 2017

(30) Foreign Application Priority Data
Mar. 11, 2016 (KR) .................. 10-2016-0029264

(51) Int. Cl.
*G06K 9/28* (2006.01)
*G06K 9/00* (2006.01)

(52) U.S. Cl.
CPC ....... *G06K 9/0002* (2013.01); *G06K 9/00892* (2013.01); *G06K 2009/00932* (2013.01)

(58) Field of Classification Search
CPC ........... G06K 9/0002; G06K 9/00006–9/0012; G06K 2009/00932
See application file for complete search history.

(56) References Cited

U.S. PATENT DOCUMENTS

| 9,424,456 B1* | 8/2016 | Kamath Koteshwara ......... G06K 9/0002 |
| 2016/0092715 A1* | 3/2016 | Yazdandoost ........ G06K 9/0002 382/124 |

FOREIGN PATENT DOCUMENTS

| KR | 10-2002-7001696 | 10/2002 |
| KR | 10-2003-0081724 | 5/2005 |
| KR | 10-2007-7012461 | 10/2007 |
| KR | 10-2011-7025122 | 12/2011 |
| KR | 10-2011-7025136 | 12/2011 |
| KR | 10-2015-7021371 | 10/2015 |

* cited by examiner

*Primary Examiner* — Brian Werner
(74) *Attorney, Agent, or Firm* — STIP Law Group, LLC

(57) ABSTRACT

The present invention relates to a method a biological information recognition apparatus and a method for activating, by the biological information recognition apparatus, a recognition row and a recognition column including a plurality of piezoelectric elements in various patterns. More specifically, the present invention relates to a biological information recognition apparatus which may be used to identify a user by recognizing biological information, such as the fingerprint, blood vessels, and bones of the user and a method for driving the same. More specifically, the present invention relates to a methodology in which a plurality of recognition rows and recognition columns within the biological information recognition apparatus are activated according to a specific pattern and when each of the recognition rows or recognition columns is activated, biological information, such as the fingerprint, blood vessels, and bones of a user, is scanned in various patterns by selectively activating piezoelectric elements forming each recognition row or recognition column.

13 Claims, 8 Drawing Sheets

[Fig. 1]
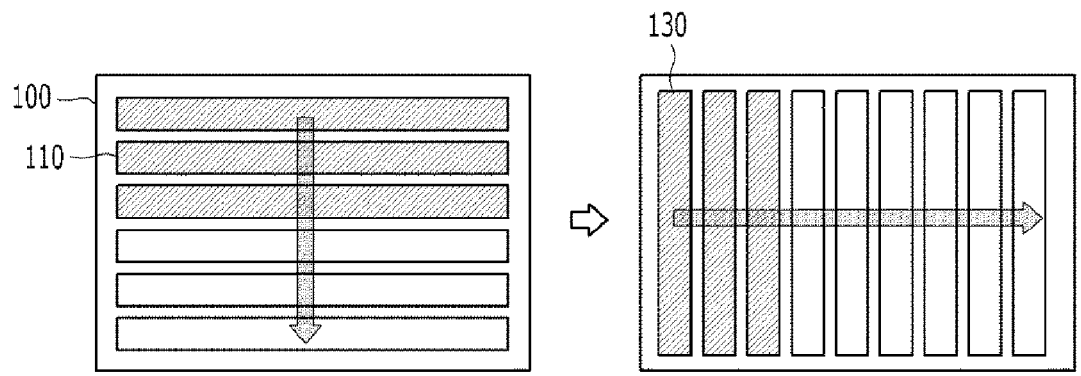
[Fig. 2]
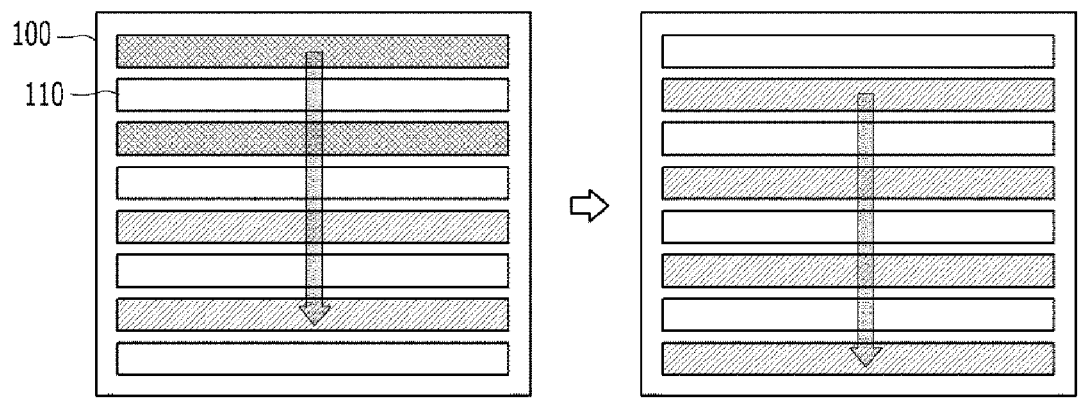
[Fig. 3]
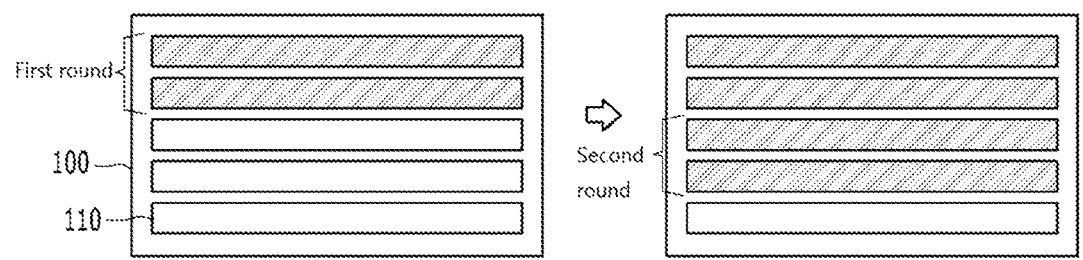

[Fig. 4]
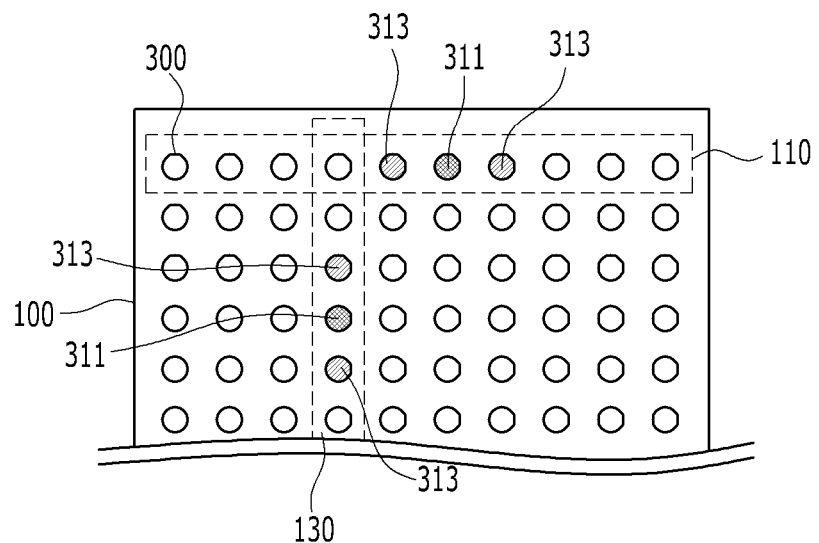
[Fig. 5]
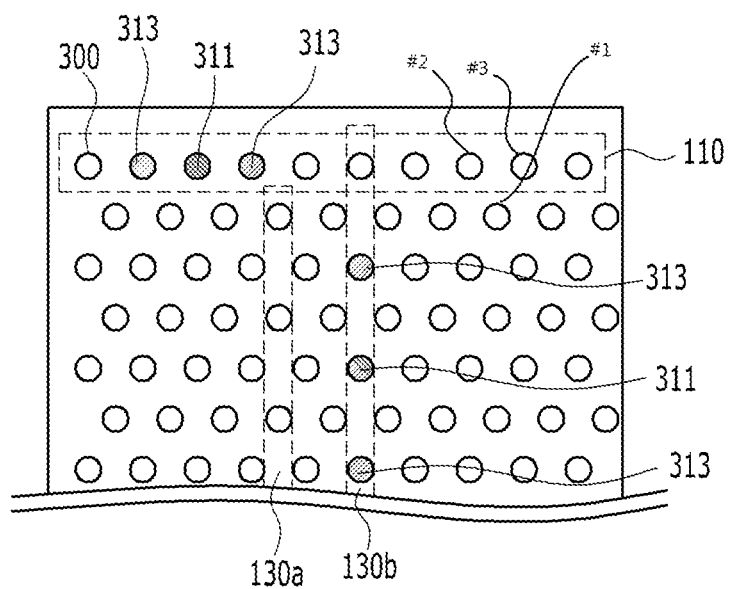

[Fig. 6]
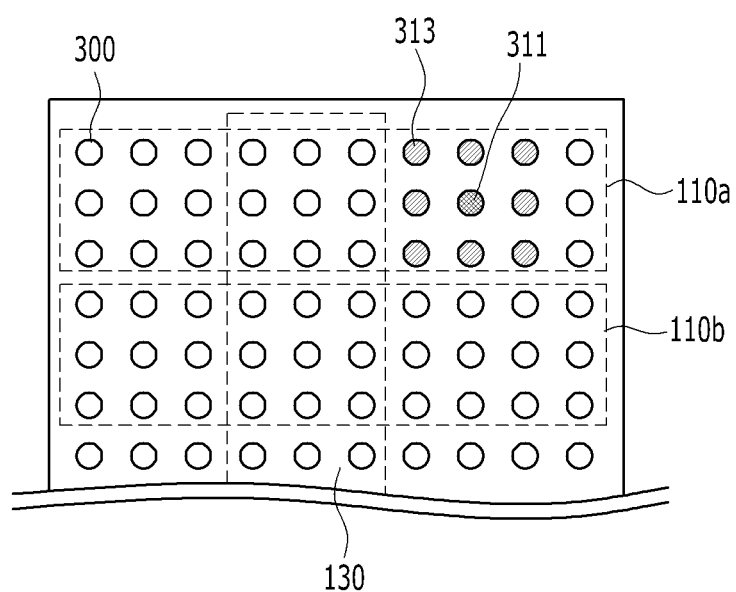

[Fig. 7]
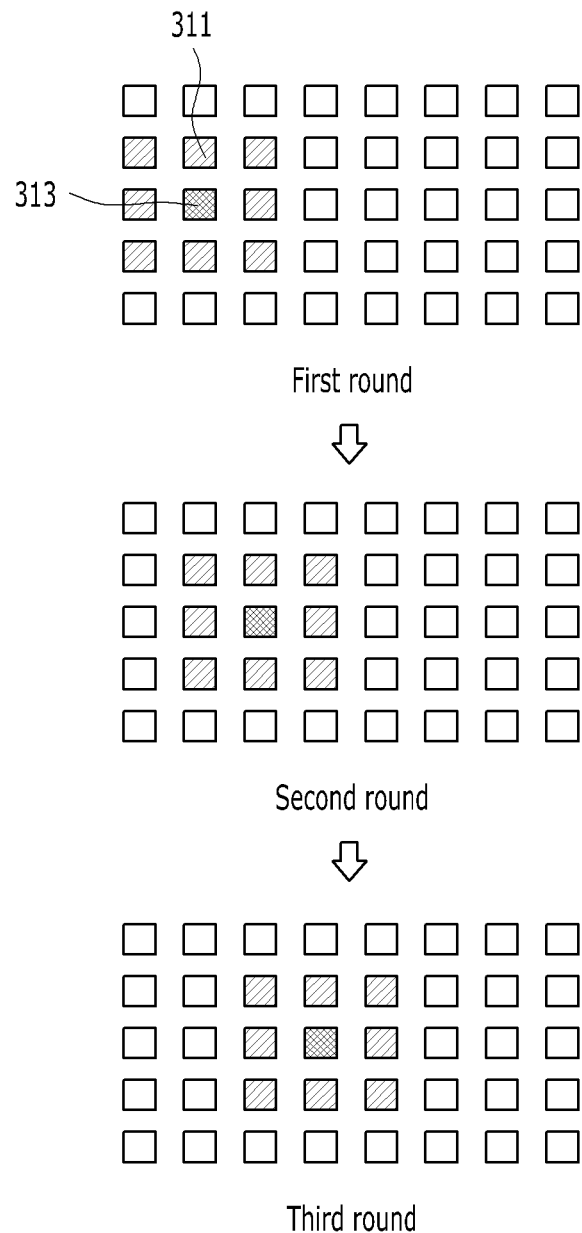

[Fig. 8]
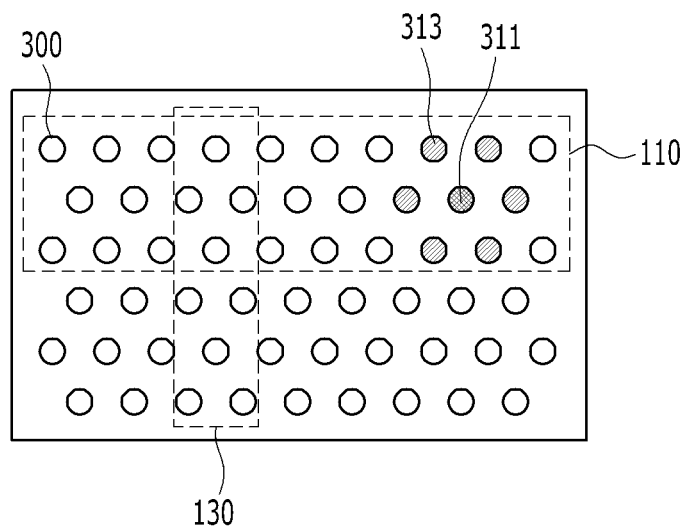

[Fig. 9]
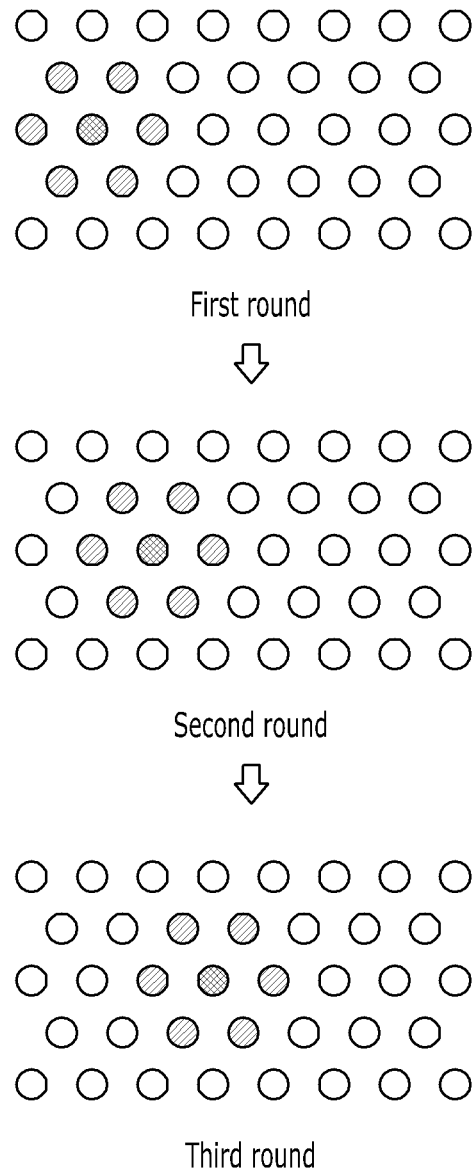

[Fig. 10]
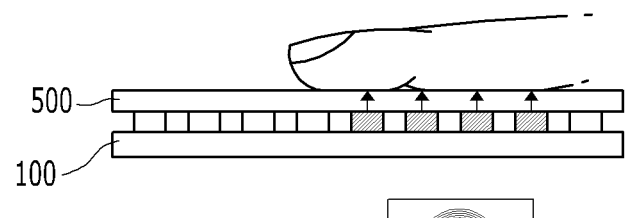
image of fingerprint
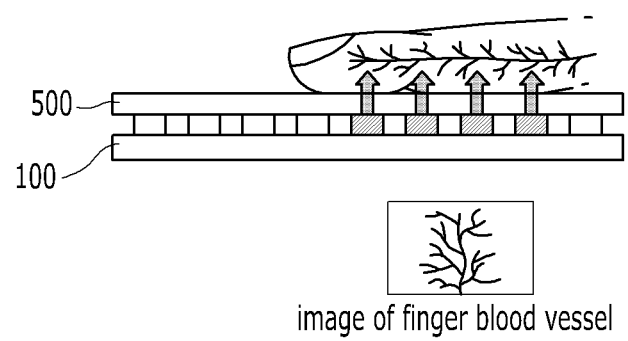
image of finger blood vessel

[Fig. 11]
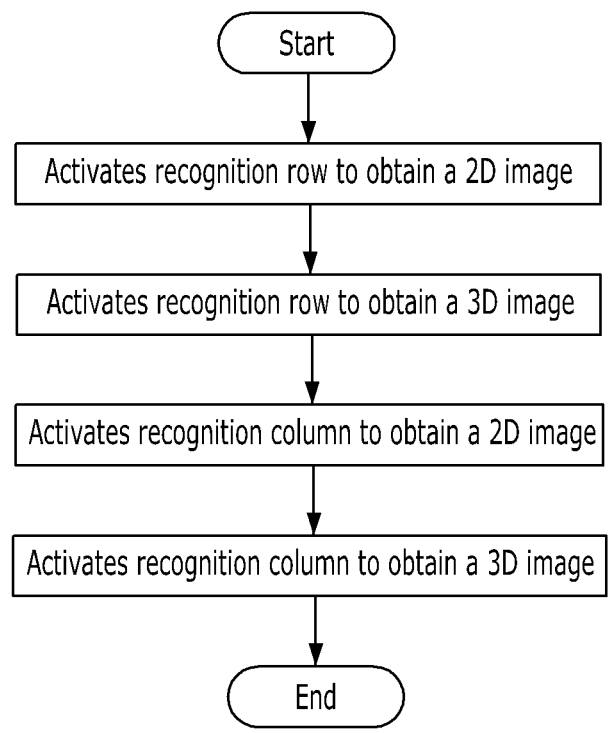

BIOLOGICAL INFORMATION RECOGNITION APPARATUS AND SCANNING METHOD OF THE BIOLOGICAL INFORMATION RECOGNITION APPARATUS

CROSS REFERENCE TO RELATED APPLICATION

The present application claims the benefit of Korean Patent Application No. 10-2016-0029264 filed in the Korean Intellectual Property Office on Mar. 11, 2016, the entire contents of which are incorporated herein by reference.

BACKGROUND OF THE INVENTION

1. Technical Field

The present invention relates to a method a biological information recognition apparatus and a method for activating, by the biological information recognition apparatus, a recognition row and a recognition column including a plurality of piezoelectric elements in various patterns. More specifically, the present invention relates to a biological information recognition apparatus which may be used to identify a user by recognizing biological information, such as the fingerprint, blood vessels, and bones of the user and a method for driving the same. More specifically, the present invention relates to a methodology in which a plurality of recognition rows and recognition columns within the biological information recognition apparatus are activated according to a specific pattern and when each of the recognition rows or recognition columns is activated, biological information, such as the fingerprint, blood vessels, and bones of a user, is scanned in various patterns by selectively activating piezoelectric elements forming each recognition row or recognition column.

2. Description of the Related Art

User authentication may be said to be an essential procedure in performing all of financial transactions. More specifically, as there is a growing interest in mobile finance with the recent development of networks and portable terminals, there is an increasing demand for a rapid and accurate user authentication apparatus and authentication method.

The fingerprint of a finger of a user is one of authentication media capable of satisfying such a demand. Many businessmen and developers continue to develop an apparatus and method capable of authentication using the fingerprint of a user.

In relation to a fingerprint recognition apparatus, active research is recently carried out on a so-called ultrasonic method for identifying the form of a fingerprint by generating ultrasonic waves, which is different from a conventional method for capturing an image of a fingerprint using an optical method.

Various technical spirits are required to check biological information about a user as an ultrasonic signal. The present invention relates to a method for scanning biological information about a user, more precisely, unique personal information, such as the shapes of a fingerprint, blood vessels, and bones, in what pattern. More specifically, in an embodiment of the present invention, an efficient scanning pattern can be implemented by selectively activating a plurality of piezoelectric elements formed on a substrate.

The present invention has been invented based on such a technical background and also has been invented to satisfy the aforementioned technical needs and to provide additional technical elements that may not be easily invented by those skilled in the art to which the present invention pertains.

PRIOR ART DOCUMENT

Patent Document (Patent Document 1) Korean Patent Application Publication No. 10-2005-0047921 (May 23, 2005)

SUMMARY OF THE INVENTION

An object of the present invention is to enable a biological information recognition apparatus to scan biological information about a user, more specifically, the shapes of the fingerprint, blood vessels, and bones of a finger of the user by selectively activating a plurality of recognition rows and recognition columns.

More specifically, in this case, the biological information recognition apparatus sets a plurality of piezoelectric elements formed on a substrate as a plurality of rows (or recognition rows) or a plurality of columns (or recognition columns) and scans biological information in various manners by activating each of the recognition rows and the recognition columns according to a specific pattern.

Another object of the present invention is to obtain a two-dimensional image and a three-dimensional image at the same time through one scanning by generating a first ultrasonic signal for obtaining an image of the fingerprint of a finger (i.e., the two-dimensional image) and a second ultrasonic signal for obtaining images of blood vessels and bones within the finger (i.e., the three-dimensional image) when each of recognition rows and recognition columns are activated.

In an embodiment of the present invention, in a method for scanning, by a biological information recognition apparatus, biological information about a user, the biological information recognition apparatus includes n recognition rows and m recognition columns including a plurality of piezoelectric elements. The method include the steps of (a) sequentially activating, by the biological information recognition apparatus, a first recognition row to an n-th recognition row and (b) then sequentially activating a first recognition column to an m-th recognition column.

Furthermore, in the scanning method of the biological information recognition apparatus, the step (a) may include sequentially activating odd-numbered recognition rows and sequentially activating even-numbered recognition rows. The step (b) may include sequentially activating odd-numbered recognition columns and sequentially activating even-numbered recognition columns.

Furthermore, in the scanning method of the biological information recognition apparatus, the step (a) may include dividing the n recognition rows into groups of two or more recognition rows, setting the groups of two or more recognition rows, and activating the groups of two or more recognition rows for each recognition row group. The step (b) may include dividing the m recognition rows into groups of two or more recognition columns, setting the groups of two or more recognition columns, and activating the groups of two or more recognition columns for each recognition column group.

In the scanning method of the biological information recognition apparatus, the recognition row or the recognition column may include a plurality of piezoelectric elements. The plurality of piezoelectric elements may be arranged in one row in the recognition row and arranged in one column in the recognition column.

In this case, when the recognition row or the recognition column is activated, piezoelectric elements arranged in each recognition row or recognition column may be simultaneously activated.

Alternatively, when the recognition row or the recognition column is activated, one or more of piezoelectric elements arranged in each recognition row or recognition column may be selectively activated.

In the scanning method of the biological information recognition apparatus, the recognition row or the recognition column may include a plurality of piezoelectric elements. The plurality of piezoelectric elements may be arranged in a plurality of rows in the recognition row and arranged in a plurality of columns in the recognition column.

In this case, when the recognition row or the recognition column is activated, piezoelectric elements arranged in each recognition row or recognition column may be simultaneously activated.

Alternatively, when the recognition row or the recognition column is activated, one or more of piezoelectric elements arranged in each recognition row or recognition column may be selectively activated.

In the scanning method of the biological information recognition apparatus, activating each recognition row or each recognition column may include a first activation step of generating a first ultrasonic signal for obtaining a two-dimensional image and a second activation step of generating a second ultrasonic signal for obtaining a three-dimensional image.

In this case, the two-dimensional image may include an image of a fingerprint of the user. The three-dimensional image may include an image of a blood vessel or bone of the user.

In an embodiment of the present invention, a biological information recognition apparatus includes a substrate, a plurality of piezoelectric elements arranged on the substrate to form n recognition rows and m recognition columns, and a control unit configured to selectively activate the plurality of piezoelectric elements. The control unit may sequentially activate a first recognition row to an n-th recognition row and then sequentially activate a first recognition column to an m-th recognition column.

BRIEF DESCRIPTION OF THE DRAWINGS

FIG. 1 shows a first embodiment of a method for scanning biological information according to the present invention.

FIG. 2 shows a second embodiment of a method for scanning biological information according to the present invention.

FIG. 3 shows a third embodiment of a method for scanning biological information according to the present invention.

FIG. 4 shows the state in which piezoelectric elements formed on a substrate in a matrix form have formed one row to form one recognition row and have formed one column to form one recognition column.

FIG. 5 shows the state in which piezoelectric elements alternately formed on the substrate in front and rear rows have formed one row to form one recognition row and have formed one column to form one recognition column.

FIG. 6 shows the state in which piezoelectric elements formed on the substrate in a matrix form have formed a plurality of rows to one recognition row and have formed a plurality of columns to form one recognition column.

FIG. 7 shows the state in which piezoelectric elements are selectively activated and scanned in the state in which recognition rows and recognition columns have been configured as shown in FIG. 6.

FIG. 8 shows the state in which piezoelectric elements alternately formed on the substrate in front and rear rows have formed a plurality of rows to one recognition row and have formed a plurality of columns to form one recognition column.

FIG. 9 shows the state in which piezoelectric elements are selectively activated and scanned in the state in which recognition rows and recognition columns have been configured as shown in FIG. 8.

FIG. 10 shows the state in which a two-dimensional image and a three-dimensional image are obtained by sequentially generating a first ultrasonic signal and a second ultrasonic signal.

FIG. 11 shows a process for obtaining a two-dimensional image and a three-dimensional image through one scanning in a flowchart form.

DETAILED DESCRIPTION

The details of the objects and technical configurations of the present invention and acting effects thereof will be more clearly understood from the following detailed description based on the accompanying drawings. Hereinafter, embodiments of the present invention are described in detail with reference to the accompanying drawings.

Embodiments disclosed in this specification should not be interpreted as limiting or used to limit the scope of the present invention. It is evident to those skilled in the art that a description including the embodiments of this specification has various applications. Accordingly, unless otherwise defined by the claims, some embodiments described are illustrative for better understanding, and the scope of the present invention is not intended to be restricted by the embodiments.

Functional blocks illustrated in the drawings and described hereunder are only examples of possible implementations. In other implementations, other functional blocks may be used without departing from the spirit and scope of the detailed description. Furthermore, one or more functional blocks of the present invention are illustrated as separate blocks, but one or more of the functional blocks of the present invention may be a combination of various hardware and software elements for executing the same function.

Furthermore, it should be understood that an expression that some elements are "included" is an expression of an open type and the expression simply denotes that the corresponding elements are present, but does not exclude additional elements.

Furthermore, when one element is described as being "connected" or "coupled" to the other element, it should be understood that one element may be directly connected or coupled to the other element, but a third element may be interposed between the two elements.

Furthermore, terms, such as the first and the second, may be used to describe various elements, but the elements are not restricted by the terms. The terms are used to only distinguish one element from the other element.

When it is described that one part is "connected" to the other part, the one part may be "directly connected" to the other part or may be "indirectly connected" to the other part through a third part. Furthermore, when it is said that one part "includes (or comprises)" the other part, the word "include (or comprise)" will be understood to imply the inclusion of stated parts but not the exclusion of any other parts, unless explicitly described to the contrary.

Hereinafter, methods for scanning a biological information recognition apparatus according to embodiments of the present invention are described below with reference to the accompanying drawings.

Prior to a description of the scanning methods, a basic structure of a biological information recognition apparatus, that is, the subject of scanning, is described below.

First, a substrate is a plate in which a plurality of piezoelectric elements has been formed, and means an insulating material in which a conductor pattern can be formed on a surface of the insulating substrate. The substrate may have stiffness or flexibility. A material for manufacturing the substrate may include chemically reinforced/semi-reinforced glass, such as soda lime glass or alumino silicate glass, reinforced or flexible plastic, such as polyimide, polyethylene terephthalate, propylene glycol, or polycarbonate, sapphire or the like.

The substrate may be a flexible substrate, a curved substrate or a bended substrate having a flexible characteristic. A biological information recognition apparatus including the substrate may have a flexible, curved or bended characteristic depending on the use and function of a terminal including the corresponding biological information recognition apparatus.

In an embodiment, the substrate may be a printed circuit board (PCB). In the PCB, electrical wires for connecting circuit parts are represented in a wire pattern based on a circuit design. An electrical conductor may reappear on an insulating matter, electrical parts may be mounted on the PCB, and wires for connecting the electrical parts may be formed in the PCB. Parts other than a function for electrically connecting parts may be firmly fixed to the PCB.

The biological information recognition apparatus according to an embodiment of the present invention may further include a cover substrate. The cover substrate is formed on the plurality of piezoelectric elements formed on the substrate, and means a substrate directly touched by a user's finger. The cover substrate may be made of the same raw material as the substrate and may be made of glass, for example. FIG. 10 shows an example in which the cover substrate 500 has been formed.

The plurality of piezoelectric elements formed on the substrate functions to generate an ultrasonic signal or to receive the reflection of the external ultrasonic signal from the outside. The piezoelectric elements may be formed by patterning electrodes of a required form on the substrate and coating a material in which lead, zirconium, and titanium have been mixed on the patterned electrodes.

In an embodiment, a group of the piezoelectric elements are formed by patterning electrodes on one plane substrate in a specific form and stacking a coating layer of a PZT component on the electrodes, unlike in a conventional fingerprint recognition apparatus in which ceramic structures are individually disposed on the substrate or conductive electrodes one by one. In this case, a method for stacking the coating layer of a PZT component on the electrodes may include various methods, such as a method for dipping the substrate whose electrode patterning has been completed into a solution including a PZT component and a method for transferring a coating film of a PZT component on the substrate whose electrode patterning has been completed.

It is assumed that the piezoelectric elements are formed in the biological information recognition apparatus according to an embodiment of the present invention in a form, such as that of FIG. 4 or 5, as will be described later. That is, if the piezoelectric elements are formed using the aforementioned method, the array of the piezoelectric elements may be various depending on that a designer has patterned electrodes on a substrate 100 in what form. In the detailed description, it is assumed that the piezoelectric elements are arranged as shown in FIG. 4 or 5.

Furthermore, a "recognition row" or "recognition column" means a virtual row or column on the substrate including a plurality of piezoelectric elements. In this case, the recognition row or the recognition column is set by a control unit.

The control unit functions to set a plurality of piezoelectric elements as a specific recognition row or recognition column as described above and to selectively activate the plurality of piezoelectric elements. In this case, the means that the plurality of piezoelectric elements is selectively activated means that the piezoelectric elements are individually divided and activated.

More specifically, the control unit functions to set some of the plurality of piezoelectric elements formed on the substrate as a recognition row or a recognition column and to activate piezoelectric elements forming each recognition row or recognition column so that the activated elements generate an ultrasonic signal and receive a reflected wave in order to check biological information about a user.

The control unit may include at least one operation means and storage means. In this case, the operation means may be a general-purpose central processing unit (CPU) or may be a programmable device (e.g., a CPLD or an FPGA) implemented to be suitable for a specific purpose, an application-specific integrated circuit (ASIC) or a microcontroller chip. Furthermore, the storage means may include a volatile memory device, a non-volatile memory device or a non-volatile electromagnetic storage device.

In an embodiment, each of the piezoelectric elements may be individually activated. The control unit may classify the piezoelectric elements into independent identifiers and control the piezoelectric elements. Accordingly, a user biological information recognition process, that is, a scanning process, which is quite different from a conventional fingerprint recognition apparatus can be implemented.

FIG. 1 shows a first embodiment of a method for scanning user biological information according to the present invention.

Assuming that n recognition rows 110 and m recognition columns 130 have been set on a substrate 100, the biological information recognition apparatus performs scanning in a longitudinal direction by sequentially activating the first recognition row 110 to the n-th recognition row 110. In this case, scanning in the longitudinal direction may be performed in such a manner that the plurality of recognition row 110 is sequentially activated, but recognition rows 110, that is, next rows, are sequentially activated in the state in which the activation of the first recognition row 110 remains intact after the first recognition row 110 has been activated and thus all the recognition rows 110 are eventually activated. Alternatively, scanning may be performed in such a manner that a recognition row 110, that is, a next row, is activated in the state in which the activation of the first recognition row 110 has released after the first recognition row 110 has been activated, and thus only each recognition row 110 is activated.

After the activation of all the recognition rows 110 is terminated, scanning may be performed by activating the recognition columns 130 using the same method.

That is, in accordance with the embodiment of FIG. 1, when a user places his or her finger on the biological information recognition apparatus, all the recognition rows 110 are activated and all the recognition columns 130 are activated, so scanning is performed in order of the longitudinal direction→the lateral direction.

FIG. 2 shows a second embodiment of a method for scanning user biological information according to the present invention.

Referring to FIG. 2, first, the biological information recognition apparatus sequentially activates odd-numbered recognition rows 110 and then sequentially activates even-numbered recognition row 110. In this case, scanning in the longitudinal direction may be performed in such a manner that the plurality of odd-numbered or even-numbered recognition rows 110 is sequentially activated, but odd rows or even rows are sequentially activated in the state in which the activation of a first odd row or even row recognition row 110 remains intact after the first odd row or the even row recognition row 110 is activated and thus all the recognition rows 110 are eventually activated. Alternatively, scanning may be performed in such a manner that a next odd row or even row is sequentially activated in the state in which the activation of the first odd row or even row recognition row 110 has been released after the first odd row or even row recognition row 110 is activated and thus only each odd row or even row is activated.

Although not shown, after all the recognition rows 110 of the odd rows and the even rows are activated, the recognition columns 130 are activated using the same method.

If scanning is performed using a method, such as that of FIG. 2, there is an advantage in that signal interference attributable to the simultaneous activation of proximate recognition rows 110 or recognition columns 130 can be minimized. That is, if proximate recognition rows 110 or recognition columns 130 are activated by a narrow margin as shown in FIG. 1, a generated ultrasonic signal and a received reflected wave may generate interference, thereby being capable of reducing the recognition ratio. If the recognition rows 110 or the recognition columns 130 are activated as shown in FIG. 2, there are advantages in that a signal interference phenomenon can be reduced by the distance between the rows or columns and thus a reduction of the recognition ration can be reduced.

FIG. 3 shows a third embodiment of a method for scanning user biological information according to the present invention.

Referring to FIG. 3, the biological information recognition apparatus may divide n recognition rows 110 into groups of two or more recognition rows, may set the n recognition rows 110 into the groups of two or more recognition rows, and may perform scanning in the longitudinal direction by sequentially activating the groups of recognition rows. For example, referring to FIG. 3, the biological information recognition apparatus may set two recognition rows 110 as each of recognition row groups, and may activate all of the recognition rows 110 in such a way as to simultaneously activate a first recognition row group in a first round and to simultaneously activate a second recognition row group in a second round.

In this case, as shown in FIGS. 1 and 2, scanning in the longitudinal direction may be performed in such a manner that a plurality of recognition row groups is sequentially activated, but the second recognition row group is sequentially activated in the state in which the activation of the first recognition row group remains intact after the first recognition row group is activated and thus all the recognition row groups are activated. Alternatively, scanning in the longitudinal direction may be performed in such a manner that a next recognition row group is sequentially activated in the state the activation of the first recognition row group has been released after the first recognition row groups is activated and thus only each recognition row group is activated.

Although not shown, after all of the recognition row groups are activated, a recognition column group may be set and activated with respect to the recognition columns 130 using the same method.

If scanning is performed using a method, such as that of FIG. 3, there is an advantage in that scanning can be performed more rapidly compared to the embodiment of FIG. 1. That is, in accordance with the embodiment of FIG. 3, the plurality of recognition rows 110 or recognition columns 130 may be set as groups and simultaneously activated. Accordingly, scanning is performed more rapidly compared to the case where the recognition rows 110 or the recognition columns 130 are individually activated as in the embodiment of FIG. 1.

The processes for activating, by the biological information recognition apparatus, the plurality of recognition rows 110 or recognition columns 130 according to the specific patterns, that is, the scanning processes, have been described with reference to FIGS. 1 to 3.

A method for configuring the recognition rows 110 or recognition columns 130 and a method for activating piezoelectric elements 300 forming each recognition row 110 or recognition column 130 are described below with reference to FIGS. 4 to 9.

FIG. 4 shows the state in which the piezoelectric elements 300 have been arranged on the substrate 100 of the biological information recognition apparatus in a matrix form. Referring to FIG. 4, a plurality of piezoelectric elements 300 may be arranged in a traverse direction to form one row, and a plurality of other piezoelectric elements 300 may be arranged in a longitudinal direction to form one column. In this case, the rows may be formed at the same interval, and the same is true of the columns. When such an array form is viewed from a viewpoint of any one specific piezoelectric element 300, other piezoelectric elements 300 are present on the upper and lower sides and left and right of the specific piezoelectric element 300, and the distance from the upper, lower, left, and right piezoelectric elements 300 may be constant.

In the state in which the piezoelectric elements 300 have been arranged as shown in FIG. 4, the biological information recognition apparatus may set piezoelectric elements 300, arranged on one row, as one recognition row 110 and may set piezoelectric elements 300, arranged on one column, as one recognition column 130.

For example, in a step for activating the recognition rows 110, piezoelectric elements 300 forming one row may be set as a first recognition row 110, piezoelectric elements 300 forming a second row may be set as a second recognition row 110, and the first recognition row 110 and the second recognition row 110 may be sequentially activated. The same method is also applied to a step for activating the recognition columns 130.

In this case, the meaning that piezoelectric elements 300 forming each recognition row 110 or each recognition columns 130 are activated may mean that some of the piezoelectric elements 300 forming each recognition row 110 or each recognition column 130 are activated as a signal generation element 311 and the remaining piezoelectric elements 300 are activated as a signal reception element 313 so that the signal generation element 311 generates an ultrasonic signal and the signal reception element 313 receives a reflected wave signal. In this case, the reflected wave signal is generated by the reflection of the generated ultrasonic signal from a user's finger (e.g., a fingerprint, blood vessels, and bones).

In this case, the biological information recognition apparatus may activate each of the recognition rows 110 or the recognition columns 130 using two methods.

First, the biological information recognition apparatus may set the odd-numbered piezoelectric elements 300 of each of the recognition rows 110 or the recognition columns 130 as a signal generation element 311, may set the even-numbered piezoelectric elements 300 of each of the recognition rows 110 or the recognition columns 130 as a signal reception element 313, and may activate the corresponding piezoelectric elements 300 at the same time so that the corresponding piezoelectric elements function to generate ultrasonic waves and to receive reflected waves.

Second, the biological information recognition apparatus may set a specific piezoelectric element 300 of each of the recognition rows 110 or the recognition columns 130 as a signal generation element 311, may set a piezoelectric element 300 proximate to the set signal generation element 311 as a signal reception element 313, and may primarily activate the signal generation element 311 and the signal reception element 313. Furthermore, the biological information recognition apparatus may set a piezoelectric element 300 proximate to the previously set signal generation element 311 as a new signal generation element 311, may set a piezoelectric element 300 proximate the new signal generation element 311 as a new signal reception element 313, and may secondarily activate the new signal generation element 311 and the new signal reception element 313. As described above, the biological information recognition apparatus may activate each of the recognition rows 110 or the recognition columns 130 while sequentially setting the piezoelectric elements 300 as signal generation elements 311 and also setting piezoelectric elements 300 proximate to the sequentially set signal generation elements 311 as signal reception elements 313 whenever the sequentially set signal generation elements 311 are newly set. For example, referring to FIG. 4, the biological information recognition apparatus may set the second piezoelectric element 300 of the first recognition row 110 as a signal generation element 311, may set the first and third piezoelectric elements 300 of the first recognition row 110 as a signal reception element 313, and may primarily activate the corresponding piezoelectric elements 300 so that they function to generate ultrasonic waves and to receive the reflected wave of the ultrasonic waves. Furthermore, the biological information recognition apparatus may set the third piezoelectric element 300 of the first recognition row 110 as a signal generation element 311, may set the second and fourth piezoelectric elements 300 of the first recognition row 110 as a signal reception element 313, and may secondarily activate the corresponding piezoelectric elements 300. As described above, the biological information recognition apparatus may repeatedly perform such a process on all the piezoelectric elements 300 of the first recognition row 110 so that the first recognition row 110 is activated. Such a process may be likewise applied to the recognition columns 130.

FIG. 5 shows the state in which the piezoelectric elements 300 have been arranged to form a plurality of rows on the substrate 100 of the biological information recognition apparatus, but piezoelectric elements 300 forming any specific row are cornerwise arranged with respect to piezoelectric elements forming a row next above the specific row (hereinafter referred to as a "previous order row") or a row next below the specific row (hereinafter referred to as a "next order row").

The meaning that piezoelectric elements 300 in a corresponding row are cornerwise arranged with respect to piezoelectric elements 300 in a previous order row or piezoelectric elements 300 in a next order row means that the piezoelectric elements 300 of the previous order row, the piezoelectric elements 300 of the corresponding row, and the piezoelectric elements 300 of the next order row do not form a column in the longitudinal axis when they are arranged on the substrate 100. In this case, it is to be noted that the piezoelectric elements 300 in the previous order row and piezoelectric elements 300 in a row, which are present between two rows, form columns in the longitudinal axis when they are arranged on the substrate 100. That is, as shown in FIG. 5, piezoelectric elements 300 in a first row and a third row form one column when they are perpendicularly connected.

In some embodiments, when viewed based on a specific one of a plurality of piezoelectric elements 300 forming a specific row, the specific piezoelectric element 300 is configured to be arranged on an axis perpendicularly extended from the center line of a line connecting two piezoelectric elements 300 that belong to piezoelectric elements 300 forming the previous order row of the specific row and that are placed in the nearest distance from the specific piezoelectric element 300.

From FIG. 5, it may be seen that a piezoelectric element 1 in a second row is disposed on an axis perpendicularly extended from the center line of a line that connects piezoelectric elements 2 and 3 in the first row. The piezoelectric element 1 may be disposed in the same manner based on piezoelectric elements 300 in the third row in addition to the piezoelectric elements 300 in the first row.

If the piezoelectric elements 300 are formed on the substrate 100 as described above, the biological information recognition apparatus of a completed state includes the piezoelectric elements 300 having a form in which a matrix has been twisted as shown in FIG. 5.

In the state in which the piezoelectric elements 300 have been arranged as shown in FIG. 5, the biological information recognition apparatus may set piezoelectric elements 300 arranged in one row as a single recognition row 110, and may set piezoelectric elements 300 arranged in one column as a single recognition column 130. In this case, the single recognition column 130 includes a set of piezoelectric elements 300 placed in odd-numbered rows or a set of piezoelectric elements 300 placed in even-numbered rows.

Furthermore, as in the embodiment of FIG. 4, the biological information recognition apparatus may activate each of the recognition rows 110 or the recognition columns 130 using two methods. That is, the biological information recognition apparatus may set the odd-numbered piezoelectric elements 300 of each of the recognition rows 110 or the recognition columns 130 as a signal generation element 311, may set the even-numbered piezoelectric elements 300 of each of the recognition rows 110 or the recognition columns 130 as a signal reception element 313 (or may set the odd-numbered piezoelectric elements 300 of each of the recognition rows 110 as a signal reception element 313 and set the even-numbered piezoelectric elements 300 of each of the recognition rows 110 as a signal generation element 311), and may simultaneously activate the corresponding piezoelectric elements 300 so that they function to generate ultrasonic waves and to receive reflected waves. Alternatively, the biological information recognition apparatus may set a specific piezoelectric element 300 of each of the recognition rows 110 or the recognition columns 130 as a signal generation element 311, may set a piezoelectric element 300 proximate to the signal generation element 311 as a signal reception element 313, and may primarily activate the signal generation element 311 and the signal reception element 313. Furthermore, the biological information recognition apparatus may set a piezoelectric element 300 proximate to the previously set signal generation element 311 as a signal generation element 311, may set a piezoelectric element 300 proximate to the previously set signal generation element 311 as a signal reception element 313, and may secondarily activate the signal generation element 311 and the signal reception element 313. As described above, the biological information recognition apparatus may activate each of the recognition rows 110 or the recognition columns 130 while sequentially setting the piezoelectric elements 300 as signal generation elements 311 and also setting piezoelectric elements 300 proximate to the sequentially set signal generation elements 311 as signal reception elements 313 whenever the sequentially set signal generation elements 311 are newly set.

FIG. 6 shows an embodiment in which in the state in which the piezoelectric elements 300 have been arranged on the substrate 100 in a matrix form, such as that of FIG. 4, the biological information recognition apparatus has set piezoelectric elements 300 arranged in a "plurality" of rows as a single recognition row 110 and has set piezoelectric elements 300 arranged in a "plurality" of columns as a single recognition column 130.

The embodiment of FIG. 6 is only an example, and shows that piezoelectric elements 300 in three rows on the substrate 100 are recognized as a single recognition row 110 and piezoelectric elements 300 in three columns on the substrate 100 are recognized as a single recognition column 130. A process for performing, by the biological information recognition apparatus, biological information scanning according to the recognition row 110 by selectively activating the piezoelectric elements 300 on the recognition row 110 is described below.

In a first step, the biological information recognition apparatus sets one or more of the plurality of piezoelectric elements 300 as a signal generation element 311. The signal generation element 311 means a piezoelectric element 300 capable of generating an ultrasonic signal. The control unit applies an electrical signal (or a pulse signal) to a specific piezoelectric element 300 so that the specific piezoelectric element 300 generates an ultrasonic signal by generating vibration. In this case, the size of the ultrasonic signal may be different depending on the size of the electrical signal applied to the signal generation element 311. Furthermore, the control unit may store the identifier of each of the piezoelectric elements 300 formed on the substrate 100. If a specific piezoelectric element 300 at a specific location is to be set as the signal generation element 311, the control unit may set and activate the specific piezoelectric element 300 by applying an electrical signal to the specific piezoelectric element 300 based on the identifier of the specific piezoelectric element 300.

In a second step, the biological information recognition apparatus sets one or two or more of the piezoelectric elements 300 other than the set signal generation element 311 as a signal reception element 313. The signal reception element 313 functions to receive the reflected waves of the ultrasonic signal generated by the signal generation element 311, which have been reflected by the biological tissue of a user. In this case, the biological information recognition apparatus may set a piezoelectric element 300 that is the closest to the signal generation element 311 as the signal reception element 313. Accordingly, the reflected wave signal can be received more clearly because an energy loss according to the travel of an ultrasonic signal in the air. If a signal generation element 311 is any one specific piezoelectric element 300, piezoelectric elements 300 on the upper and lower sides and left and right of the signal generation element 311 may be set as a signal reception element 313. It should be understood that such a pattern method is only an embodiment and the control unit may set a piezoelectric element 300 at a specific location as a signal reception element 313 regardless of proximity with a signal generation element 311. For example, in the case of FIG. 7, eight piezoelectric elements 300 around a signal generation element 311 may be set as a signal reception element 313.

In a third step and a fourth step, the set signal generation element 311 and the set signal reception element 313 are activated and driven depending on their functions. More specifically, the biological information recognition apparatus activates the signal generation element 311 so that it generates an ultrasonic signal, and activates the signal reception element 313 so that it receives a reflected wave signal.

After the fourth step, in a fifth step, the biological information recognition apparatus sets any one of a plurality of piezoelectric elements 300 proximate to the signal generation element 311 as a new signal generation element 311. In this case, one of the piezoelectric elements 300 proximate to the signal generation element 311 set in the first step is set as the new signal generation element 311. For example, the new signal generation element 311 set in the fifth step may be one of piezoelectric elements 300 on the left or right of the signal generation element 311 set in the first step.

The directivity of the signal generation element 311 newly set in the fifth step also has association with a scanning direction. That is, if a piezoelectric element 300 on the right of the signal generation element 311 is set as the newly set signal generation element 311, the scanning direction is a right direction. If a piezoelectric element 300 in the diagonal direction of the signal generation element 311 is set as the newly set signal generation element 311, the scanning direction is a diagonal direction.

In a sixth step, the biological information recognition apparatus newly sets a signal reception element 313 in accordance with the new signal generation element 311 set in the fifth step. The sixth step is performed in a manner similar to that in which the signal reception element 313 is set in the second step.

The signal reception element 313 set in the sixth step may be redundant with the signal reception element 313 set in the second step. As may be seen from FIG. 7, if a signal generation element 311 is moved to the right and set by one piezoelectric element, a corresponding signal reception element 313 is also moved to the right along the signal generation element 311. In this case, some redundant piezoelectric elements 300, that is, signal reception elements 313 may be present.

Finally, in a seventh step and an eighth step, the newly set signal generation element 311 and the newly set signal reception element 313 are activated so that they function to generate ultrasonic waves and to receive the reflected waves of the ultrasonic waves, respectively.

In the method of activating the piezoelectric elements 300 according to an embodiment of the present invention, the first step to the eighth step are repeatedly performed. A process for setting and activating signal generation elements 311 from one end of any recognition row 110 or recognition column 130 to the tip of the recognition row 110 or recognition column 130 is repeatedly performed. Accordingly, when a user places his or her finger on the biological information recognition apparatus, the biological information recognition apparatus enables piezoelectric elements 300 to perform the process of generating ultrasonic waves and receiving the reflected waves of the ultrasonic waves by setting signal generation elements 311 in one row or a plurality of rows, setting signal reception elements 313 in one row or a plurality of rows, and activating the set signal generation elements 311 and signal reception elements 313.

FIG. 8 shows an embodiment in which in the state in which the piezoelectric elements 300 have been arranged on the substrate 100 in a form, such as that of FIG. 5, the biological information recognition apparatus has set piezoelectric elements 300 arranged in a "plurality" of rows as a single recognition row 110 and has set piezoelectric elements 300 arranged in a "plurality" of columns as a single recognition columns 130.

The embodiment of FIG. 8 is only an example, and shows that piezoelectric elements 300 in three rows on the substrate 100 are recognized as a single recognition row 110 and piezoelectric elements 300 in three rows on the substrate 100 are recognized as a single recognition column 130. A process for performing, by the biological information recognition apparatus, biological information scanning according to the recognition row 110 by selectively activating the piezoelectric elements 300 on the recognition row 110 is described below.

In a first step, the biological information recognition apparatus sets one or more of the plurality of piezoelectric elements 300 as a piezoelectric element 300 and sets the piezoelectric element 300 as a signal generation element 311.

In a second step, the biological information recognition apparatus sets one or two or more of the piezoelectric elements 300 other than the previously set signal generation element 311 as a signal reception element 313. If the signal generation element 311 is any one specific piezoelectric element 300, piezoelectric elements 300 around the signal generation element 311 may be set as the signal reception element 313. For example, referring to FIG. 8, six piezoelectric elements 300 around a signal generation element 311 in one recognition row 110 may be set as a signal reception element 313.

In a third step and a fourth step, the previously set signal generation element 311 and the previously set signal reception element 313 are activated and driven depending on their functions. More specifically, the biological information recognition apparatus activates the previously set signal generation element 311 so that it generates an ultrasonic signal, and activates the previously set signal reception element 313 so that it receives a reflected wave signal.

After the fourth step, in a fifth step, the biological information recognition apparatus sets any one of a plurality of piezoelectric elements 300 proximate to the previously set signal generation element 311 as a new signal generation element 311. In this case, a piezoelectric element 300 proximate to the signal generation element 311 set in the first step is selected as the new signal generation element 311. For example, any one of piezoelectric elements 300 in the left, right or diagonal direction of the signal generation element 311 set in the first step may be set as the new signal generation element 311 set in the fifth step.

The directivity of the signal generation element 311 newly set in the fifth step also has association with a scanning direction. That is, if a piezoelectric element 300 on the right of a previously set signal generation element 311 is set as the newly set signal generation element 311, the scanning direction is the right direction. If a piezoelectric element 300 in the diagonal direction of the previously set signal generation element 311 is set as the newly set signal generation element 311, the scanning direction is the diagonal direction.

In a sixth step, the biological information recognition apparatus newly sets a signal reception element 313 in accordance with the new signal generation element 300 set in the fifth step. The sixth step is performed in a manner similar to that in which the signal reception element 313 is set in the second step.

Finally, in a seventh step and an eighth step, the newly set signal generation element 311 and the newly set signal reception element 313 are activated so that they function to generate ultrasonic waves and to receive the reflected wave of the ultrasonic waves, respectively.

FIG. 9 shows the state in which piezoelectric elements 300 in a recognition row 110 are selectively activated in accordance with the first step to the eighth step. In the method for activating the piezoelectric elements 300 according to an embodiment of the present invention, as described above, the first step to the eighth step are repeatedly performed. A process for setting and activating signal generation elements 311 from one end of any specific row or specific column to the tip of the specific row or specific column is repeatedly performed. Accordingly, when a user places his or her finger on the biological information recognition apparatus, the biological information recognition apparatus sets and activates a signal generation element 311 and a signal reception element 313 in one row or a plurality of rows so that piezoelectric elements 300 repeatedly perform a process for generating ultrasonic waves and receiving the reflected wave of the ultrasonic waves. Accordingly, the biological information recognition apparatus can obtain biological information, such as the shapes of the fingerprint, blood vessels and bones of the user using the received reflected wave signal.

As described above, the methods for setting, by the biological information recognition apparatus according to an embodiment of the present invention, a plurality of piezoelectric elements 300 as a recognition row 110 or recognition column 130, activating the recognition row 110 or the recognition column 130 in what pattern, and dividing piezoelectric elements 300 within each of the recognition rows 110 or the recognition columns 130 into a signal generation element 311 and a signal reception element 313, and activating the signal generation element 311 and the signal reception element 313 have been described above.

A process for obtaining, by the biological information recognition apparatus, a two-dimensional image and three-dimensional image of user biological information at the same time is described below with reference to FIGS. 10 and 11.

When activating each of the recognition rows 110 or the recognition columns 130, more specifically, when selectively activating piezoelectric elements 300 within each of the recognition rows 110 or the recognition columns 130, the biological information recognition apparatus according to an embodiment of the present invention may control a signal generation element 311 so that it generates an ultrasonic signal having a different frequency.

The ultrasonic signal having a different frequency may be reflected from a surface of the fingerprint of a finger of a user depending on the degree that it can transmit a user biological tissue or may be reflected from a surface of blood vessels or bones within a user's finger. The biological information recognition apparatus according to an embodiment of the present invention can obtain a two-dimensional image (e.g., an image of a fingerprint) and a three-dimensional image (e.g., images of finger blood vessels and bones) through one scanning as shown in FIG. 10 using such a property of the ultrasonic signal.

FIG. 11 shows the scanning process of FIG. 10 in a flowchart form.

Referring to FIG. 11, first, the biological information recognition apparatus primarily activates a recognition row 110, that is, generates a first ultrasonic signal, in order to obtain a two-dimensional image, and secondarily activates the recognition row 110, that is, generates a second ultrasonic signal, in order to obtain a three-dimensional image. Furthermore, after the recognition rows 110 is activated in order to obtain the two-dimensional image and the three-dimensional image, the biological information recognition apparatus activates recognition columns 130 likewise.

In the process for activating the recognition row 110, the activation for obtaining the two-dimensional image and the three-dimensional image may be performed using two methods.

First, the biological information recognition apparatus may primarily perform activation for the recognition row 110 for obtaining the two-dimensional image with respect to all of the recognition rows 110, and may perform activation for the recognition row 110 for obtaining the three-dimensional image again. At this time, when a user's finger is placed on the biological information recognition apparatus, the activation for the recognition row 110 is twice performed. In each of the activation processes, a first ultrasonic signal and a second ultrasonic signal are generated as described above.

Second, when activating one recognition row 110, the biological information recognition apparatus may generate a first ultrasonic signal and then immediately generate a second ultrasonic signal. For example, assuming that activation for the first recognition row 110 is performed, the biological information recognition apparatus may perform control so that a second ultrasonic signal is generated right after a first ultrasonic signal is generated, and thus both a partial two-dimensional image and a partial three-dimensional image can be obtained from the first recognition row 110.

The construction of the biological information recognition apparatus according to an embodiment of the present invention and the methods for scanning biological information about a user using the biological information recognition apparatus, that is, the various methods for activating a plurality of recognition rows and recognition columns in various patterns, have been described above with reference to the accompanying drawings.

In accordance with an embodiment of the present invention, the plurality of piezoelectric elements formed on the substrate can be set as a specific row (or a specific recognition row) and a specific column (or a specific recognition column) determined by a user, and each recognition row and each recognition column can be activated in various patterns. Accordingly, there is an advantage in that biological information can be scanned in various ways.

Furthermore, in accordance with an embodiment of the present invention, when user biological information is scanned, a two-dimensional image and a three-dimensional image are obtained at the same time by sequentially generating ultrasonic signals having different frequencies and sizes. Accordingly, there is an advantage in that user authentication can be performed more accurately.

Although some embodiments and application examples of the present invention have been illustrated and described above, the present invention is not limited to the aforementioned specific embodiments and application examples and may be modified in various ways by those skilled in the art to which the present invention pertains without departing from the gist of the present invention written in the claims. Such modified embodiments should not be construed as being distinct from the technical spirit or prospect of the present invention.

What is claimed is:

1. A method for scanning, by a biological information recognition apparatus, biological information about a user, wherein:
   the biological information recognition apparatus comprises n recognition rows and m recognition columns comprising a plurality of piezoelectric elements, and
   the method comprises steps of (a) sequentially activating, by the biological information recognition apparatus, a first recognition row to an n-th recognition row and (b) then sequentially activating a first recognition column to an m-th recognition column,
   wherein at least one of the piezoelectric elements arranged on each of the recognition rows or the recognition columns is activated in a time series manner when the recognition row or the recognition column is activated,
   the activation of the piezoelectric elements arranged in each recognition row or recognition column in the steps (a) and (b) comprises following steps:
   a first step of setting one specific piezoelectric element among the plurality of piezoelectric elements as a first signal generation element;
   a second step of setting at least one piezoelectric element approximate to the first signal generation element other than the first signal generation element as a first signal reception element;
   a third step of generating a first ultrasonic signal by activating the first signal generation element;
   a fourth step of receiving a first reflected wave signal by activating the first signal reception element, wherein the first reflected wave signal is generated by a reflection of the first ultrasonic signal from a biological tissue, which is generated by the first signal generation element;
   a fifth step of setting any one of a plurality of piezoelectric elements approximate to the first signal generation element as a second signal generation element;
   a sixth step of setting one or more piezoelectric elements approximate to the second signal generation element other than the second signal generation element as a second signal reception element;

a seventh step of generating a second ultrasonic signal by activating the second signal generation element; and an eighth step of receiving a second reflected wave signal by activating the second signal reception element, wherein the second reflected wave signal is generated by a reflection of the second ultrasonic signal from the biological tissue, which is generated by the second signal generation element.

2. The method of claim 1, wherein:
the step (a) comprises sequentially activating odd-numbered recognition rows and sequentially activating even-numbered recognition rows, and
the step (b) comprises sequentially activating odd-numbered recognition columns and sequentially activating even-numbered recognition columns.

3. The method of claim 1, wherein,
the step (a) comprises dividing the n recognition rows into groups of two or more recognition rows, setting the groups of two or more recognition rows, and activating the groups of two or more recognition rows for each recognition row group, and
the step (b) comprises dividing the m recognition rows into groups of two or more recognition columns, setting the groups of two or more recognition columns, and activating the groups of two or more recognition columns for each recognition column group.

4. The method of claim 1, wherein:
the recognition row or the recognition column comprises a plurality of piezoelectric elements, and
the plurality of piezoelectric elements is arranged in one row in the recognition row and arranged in one column in the recognition column.

5. The method of claim 1, wherein:
the recognition row or the recognition column comprises a plurality of piezoelectric elements, and
the plurality of piezoelectric elements is arranged in a plurality of rows in the recognition row and arranged in a plurality of columns in the recognition column.

6. The method of claim 1, wherein activating each recognition row or each recognition column comprises:
a first activation step of generating a third ultrasonic signal for obtaining a two-dimensional image; and
a second activation step of generating a fourth ultrasonic signal for obtaining a three-dimensional image.

7. The method of claim 6, wherein the two-dimensional image comprises an image of a fingerprint of the user.

8. The method of claim 6, wherein the three-dimensional image comprises an image of a blood vessel or bone of the user.

9. A biological information recognition apparatus, comprising:
a substrate;
a plurality of piezoelectric elements arranged on the substrate to form n recognition rows and m recognition columns; and
a controller configured to selectively activate the plurality of piezoelectric elements, wherein the controller sequentially activates a first recognition row to an n-th recognition row and then sequentially activates a first recognition column to an m-th recognition column,
wherein at least one of the piezoelectric elements arranged on each of the recognition rows or the recognition columns is activated in a time series manner when the recognition row or the recognition column is activated,
the activation of the piezoelectric elements arranged in each recognition row or recognition column comprises following steps:
a first step of setting one specific piezoelectric element among the plurality of piezoelectric elements as a first signal generation element;
a second step of setting at least one piezoelectric element approximate to the first signal generation element other than the first signal generation element as a first signal reception element;
a third step of generating a first ultrasonic signal by activating the first signal generation element;
a fourth step of receiving a first reflected wave signal by activating the first signal reception element, wherein the first reflected wave signal is generated by a reflection of the first ultrasonic signal from a biological tissue, which is generated by the first signal generation element;
a fifth step of setting any one of a plurality of piezoelectric elements approximate to the first signal generation element as a second signal generation element;
a sixth step of setting one or more piezoelectric elements approximate to the second signal generation element other than the second signal generation element as a second signal reception element;
a seventh step of generating a second ultrasonic signal by activating the second signal generation element; and
an eighth step of receiving a second reflected wave signal by activating the second signal reception element, wherein the second reflected wave signal is generated by a reflection of the second ultrasonic signal from the biological tissue, which is generated by the second signal generation element.

10. The method of claim 1, wherein, in the fifth step, the second signal generation element is one of the at least one piezoelectric element set as the first signal reception element formed in the second step.

11. The method of claim 1, wherein, in the sixth step, the second signal reception element includes the first signal generation element formed in the first step.

12. The biological information recognition apparatus of claim 9, wherein, in the fifth step, the second signal generation element is one of the at least one piezoelectric element set as the first signal reception element formed in the second step.

13. The biological information recognition apparatus of claim 9, wherein, in the sixth step, the second signal reception element includes the first signal generation element formed in the first step.

* * * * *